United States Patent
Choi et al.

(10) Patent No.: US 11,140,752 B2
(45) Date of Patent: Oct. 5, 2021

(54) INDUCTION HEATING DEVICE HAVING REDUCED NUMBER OF WIRE HARNESSES

(71) Applicant: LG Electronics Inc., Seoul (KR)

(72) Inventors: Hyojin Choi, Seoul (KR); Seongho Son, Seoul (KR); Jaekyung Yang, Seoul (KR); Yongsoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 414 days.

(21) Appl. No.: 16/276,180

(22) Filed: Feb. 14, 2019

(65) Prior Publication Data

US 2019/0306928 A1    Oct. 3, 2019

(30) Foreign Application Priority Data

Mar. 27, 2018 (KR) .................. 10-2018-0035258

(51) Int. Cl.
*H05B 6/06* (2006.01)
*H05B 6/12* (2006.01)
*H01R 12/71* (2011.01)
*H01R 13/24* (2006.01)

(52) U.S. Cl.
CPC ........... *H05B 6/065* (2013.01); *H01R 12/714* (2013.01); *H05B 6/1218* (2013.01); *H05B 6/1254* (2013.01); *H05B 6/1263* (2013.01); *H05B 6/1272* (2013.01); *H01R 13/2421* (2013.01); *H05B 2206/022* (2013.01); *H05B 2213/03* (2013.01)

(58) Field of Classification Search
CPC ... H03J 1/047; H01R 12/714; H01R 13/2421; H05B 2206/022; H05B 2213/03; H05B 6/065; H05B 6/1218; H05B 6/1254; H05B 6/1263; H05B 6/1272; Y02B 40/00
USPC .... 219/624, 625, 626, 620, 622, 627, 465.1, 219/447.1, 460.1, 445.1
See application file for complete search history.

(56) References Cited

U.S. PATENT DOCUMENTS

| | | |
|---|---|---|
| 4,939,454 A | 7/1990 | Miner |
| 2012/0074127 A1 | 3/2012 | Abbott |
| 2019/0297685 A1* | 9/2019 | An ....................... H05B 6/1263 |

FOREIGN PATENT DOCUMENTS

| | | | |
|---|---|---|---|
| DE | 202009000990 U1 * | 3/2009 | ........... H05B 6/1245 |
| EP | 2945464 | 11/2015 | |
| EP | 2950613 | 12/2015 | |
| JP | 2002299026 | 10/2002 | |
| JP | 2007033101 | 2/2007 | |

(Continued)

OTHER PUBLICATIONS

Extended European Search Report in European Application No. 18211232.6, dated Jun. 17, 2019, 5 pages.

*Primary Examiner* — Quang T Van
(74) *Attorney, Agent, or Firm* — Fish & Richardson P.C.

(57) ABSTRACT

An induction heating device includes: a casing; a cover plate coupled to a top of the casing, where the cover plate has a surface configured to seat an object; a first induction heating module located within the casing and configured to heat the object; a first wiring substrate that is configured to couple to a bottom of the first induction heating module and that extends in a first direction, where the first wiring substrate includes at least one of a power line or a signal line; and a first connector that is configured to couple the first wiring substrate to the bottom of the first induction heating module, where the first connector includes a pogo pin.

20 Claims, 12 Drawing Sheets

(56) References Cited

FOREIGN PATENT DOCUMENTS

| | | |
|---|---|---|
| JP | 2011233304 | 11/2011 |
| JP | 2011253805 | 12/2011 |
| JP | 2014044809 | 3/2014 |
| KR | 101173192 | 8/2012 |

* cited by examiner

INDUCTION HEATING DEVICE HAVING REDUCED NUMBER OF WIRE HARNESSES

CROSS-REFERENCE TO RELATED APPLICATIONS

This application claims the priority of Korean Patent Application No. 10-2018-0035258, filed on Mar. 27, 2018, in the Korean Intellectual Property Office, the disclosure of which is hereby incorporated by reference in its entirety.

FIELD

The present disclosure relates to an induction heating device having a reduced number of wire harnesses.

BACKGROUND

Cooking devices may use various heating methods to heat food. For example, gas ranges use gas as fuel. In some examples, cooking devices may heat a loaded object such as a cooking vessel or a pot using electricity.

Various methods of heating a loaded object using electricity may be divided into a resistive heating type and an inductive heating type. In the electrical resistive heating method, heat may be generated based on current flowing through a metal resistance wire or a non-metallic heating element such as silicon carbide. In this method, heat may be transmitted to the loaded object through radiation or conduction to heat the loaded object. In the inductive heating method, an eddy current may be generated in the loaded object made of metal based on a high-frequency power of a predetermined magnitude applied to a working coil. In this method, the loaded object may be heated by the eddy current generated based on magnetic field around the working coil.

For example, the induction heating method may be performed as follows. When power is applied to the induction heating device, a high-frequency voltage of a predetermined magnitude is applied to the working coil. As a result, an inductive magnetic field is generated around the working coil disposed in the induction heating device. When the flux of the inductive magnetic field passes through a bottom of the loaded object containing the metal loaded on the induction heating device, an eddy current is generated inside of the bottom of the loaded object. When the resulting eddy current flows in the bottom of the loaded object, the loaded object itself is heated.

In some cases, an induction heating device may include a plurality of working coils, each working coil corresponding to a heating region to heat one of a plurality of loaded-objects (e.g., a cooking vessel).

In some cases, an induction heating device may heat a single object using a plurality of working coils simultaneously. This device may be referred to as a zone-free based induction heating device.

In some cases, the zone-free based induction heating device may inductively heat the loaded-object in a heating zone corresponding to a plurality of working coils, regardless of a size and loaded position of the loaded-object.

FIG. 1 illustrates an example zone-free based inductive heating device in related art.

As shown in FIG. 1, the zone-free based induction heating device 10 may include a plurality of working coils (for example, AWC1 to AWC6, BWC1 to BWC4, and CWC1 to CWC6) that are uniformly distributed. In this example, the loaded-object thereon may be inductively heated with the plurality of working coils irrespective of the size and position of the loaded-object.

In some cases, in the zone-free based induction heating device 10, the heating region may be divided into a plurality of heating sub-regions. These sub-regions include, for example, an A sub-region AR, a B sub-region BR, and a C sub-region CR. Each sub-region has a plurality of working coils. For example, the A sub-region AR, the B sub-region BR, and the C sub-region CR have, respectively, a group of six working coils AWC1 to AWC6, a group of four working coils BWC1 to BWC4, and a group of six working coils CWC1 to CWC6. An inverter that commonly controls the working coils in a corresponding sub-region is present on a sub-region basis. In some cases, it may be difficult to independently control each working coil in each sub-region.

In some cases, the zone-free based induction heating device 10 includes the plurality of working coils. In some examples, the zone-free based induction heating device 10 may include a plurality of inverters for applying resonant current to the working coils. In some cases, a plurality of indicators (for example, light emission elements) to indicate whether the coils are driven or output intensities thereof may be required.

In some cases, wire harnesses may be used to connect the plurality of components, which may complicate the wiring connection structure. In some cases, wire harnesses for a DC power line of an auxiliary power source (for example, Switched Mode Power Supply (SMPS)) and for a signal line of a control module for an input interface are further used, which may also complicate the wiring connection structure.

In some cases, a manufacturing cost may increase and a working efficiency may decrease as the number of the wire harnesses increases.

SUMMARY

One purpose of the present disclosure is to provide an induction heating device, in which each working coil has a modular structure so that each of a plurality of working coils may be independently controlled.

Another purpose of the present disclosure is to provide an induction heating device which reduces the number of wire harnesses using a board-to-board connector-based connection.

Still another purpose of the present disclosure is to provide an induction heating device capable of reducing poor connections due to an operator's mistake when connecting board-to-board connectors.

The purposes of the present disclosure are not limited to the above-mentioned purposes. Other purposes and advantages of the present disclosure, as not mentioned above, may be understood from the following descriptions and more clearly understood from the implementations of the present disclosure. In some implementations, it will be readily appreciated that the objects and advantages of the present disclosure may be realized by features and combinations thereof as disclosed in the claims.

According to one aspect of the subject matter described in this application, an induction heating device includes: a casing; a cover plate coupled to a top of the casing, where the cover plate has a surface configured to seat an object; a first induction heating module located within the casing and configured to heat the object; a first wiring substrate that is configured to couple to a bottom of the first induction heating module and that extends in a first direction, where the first wiring substrate includes at least one of a power line or a signal line; and a first connector that is configured to couple the first wiring substrate to the bottom of the first induction heating module, where the first connector includes a pogo pin.

Implementations according to this aspect may include one or more of the following features. For example, the induction heating device may further include: a power supply located inside of the casing and configured to supply alternated current (AC) power; an auxiliary power supply located inside of the casing and configured to supply direct current (DC) power; an input interface configured to receive input from a user, which is located at a loading plate that defines the surface of the cover plate configured to seat the object; and an interface control module configured to control operation of the input interface.

In some implementations, the first induction heating module may include an induction control module configured to control operation of the first induction heating module. The interface control module may be configured to receive input from the input interface and to transfer the input to the induction control module. The first connector may include a first sub-connector, a second sub-connector, and a third sub-connector that are configured to couple to a bottom of the induction control module.

In some implementations, the power line of the first wiring substrate may include: a first power line configured to connect the power supply to the first sub-connector that is coupled to the bottom of the induction control module; and a second power line configured to connect the auxiliary power supply to the second sub-connector that is coupled to the bottom of the induction control module. The signal line may be configured to connect the interface control module to the third sub-connector that is coupled to the bottom of the induction control module, where the signal line is configured to transmit the input received from the interface control module to the induction control module.

In some implementations, the induction heating device may further include: a second induction heating module located within the casing, where the first induction heating module and the second induction heating module are arranged in the first direction; and a third induction heating module located within the casing, where the first induction heating module and the third induction heating module are arranged in a second direction perpendicular to the first direction. In some examples, the induction heating device may further include: a second wiring substrate that extends in the first direction and that is spaced apart from the first wiring substrate in the first direction; a third wiring substrate that extends in the first direction and that is spaced apart from the first wiring substrate in the second direction; a second connector that is configured to couple the second induction heating module to the second wiring substrate, where the second connector includes a pogo pin; and a third connector that is configured to couple the third induction heating module to the third wiring substrate, where the third connector includes a pogo pin. The first connector, the second connector, and the third connector are independent from one another.

In some implementations, the induction heating device may further include: a second wiring substrate that extends in the first direction that is spaced apart from the first wiring substrate in the second direction; a second connector that is configured to couple the second induction heating module to the second wiring substrate, where the second connector includes a pogo pin; a third connector that is configured to couple the third induction heating module to the second wiring substrate, where the third connector includes a pogo pin. The first connector, the second connector, and the third connector are independent from one another.

In some implementations, the first induction heating module may include: a working coil; an inverter configured to apply a resonant current to the working coil; a light guide located outside of the working coil, where the light guide has a light-emission surface that is located at a top of the light guide, that is configured to indicate whether the working coil is driven, and that is configured to indicate an output intensity of the working coil; a light emitting element located vertically below the light guide and configured to emit light to the light guide; and a control module configured to control the inverter and the light emitting element. In some examples, the first induction heating module further may include a ferrite core located vertically below the working coil and configured to diffuse magnetic field generated from the working coil, and an insulation member that is located between the ferrite core and the control module and that is configured to reduce heat transfer to the control module.

In some implementations, the first induction heating module further includes a module casing that is located vertically above the control module and that defines an accommodation space configured to accommodate the working coil, the ferrite core, and the insulation member that are vertically stacked. The module casing may further define a guide-receiving groove around the accommodation space, and the light guide may be configured to insert into and couple to the guide-receiving groove. In some examples, the control module may include a printed circuit board (PCB), and the light emitting element and the inverter are disposed on the PCB of the control module.

In some implementations, the induction heating device may further include: a first heat sink located vertically below the first induction heating module and configured to dissipate heat from the first induction heating module; a first heat pipe that passes through the first heat sink, that extends outward from the first induction heating module, and that is configured to discharge heat from the first heat sink out of the first induction heating module; an air-discharge fan located at a first longitudinal end of an inner edge of the casing and configured to discharge air from an inside of the casing out of the casing; and a cooling fan located at a second longitudinal end of the inner edge of the casing and configured to blow air to the air-discharge fan, where the first longitudinal end is opposite to the second longitudinal end. The first heat pipe may have an end that protrudes from the first induction heating module and that is located at an air-flow path defined between the cooling fan and the air-discharge fan.

In some implementations, the induction heating device may further include a guide located between the air-discharge fan and the cooling fan, the guide defining the air-flow path. In some examples, the guide extends in a second direction perpendicular to the first direction.

In some implementations, the induction heating device may further include an auxiliary cooling fan that is located at a bottom of the casing vertically below the guide and that is configured to blow air to the guide.

In some implementations, the air-discharge fan and the cooling fan protrude outward from the first wiring substrate in the first direction. In some implementations, the first heat pipe protrudes outward from the first wiring substrate in the first direction. In some implementations, the second connector is spaced apart from the first connector in the first direction, and the third connector is spaced apart from the first connector in the second direction. In some implementations, each of the first induction heating module, the second induction heating module, and the third induction heating module may include an induction control module configured to control operation of the respective induction heating module. In some implementations, each of the first connector, the second connector, and the third connector may include a plurality of sub-connectors that are configured to couple to a bottom of the respective induction control module.

Further specific effects of the present disclosure as well as the effects as described above will be described in conduction with illustrations of specific details for carrying out the disclosure.

BRIEF DESCRIPTION OF DRAWINGS

Throughout the drawings, like reference numerals refer to like elements.

DETAILED DESCRIPTION

Hereinafter, an inductive heating device according to one or more implementations of the present disclosure is illustrated.

Figure 1:
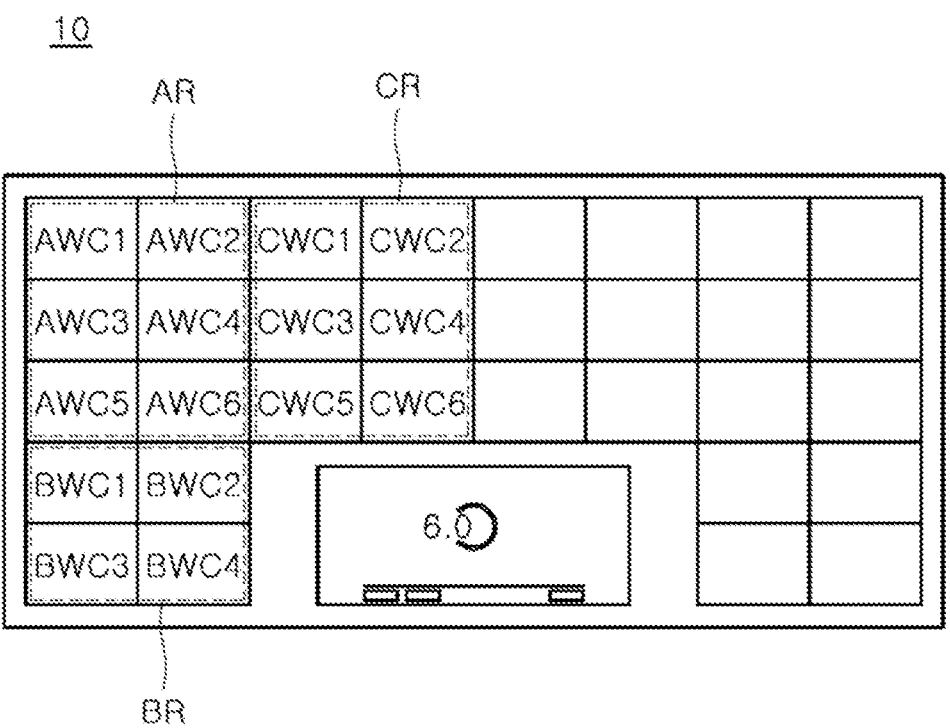
FIG. 1 is a schematic diagram illustrating an example zone-free based inductive heating device in related art.
Figure 2:
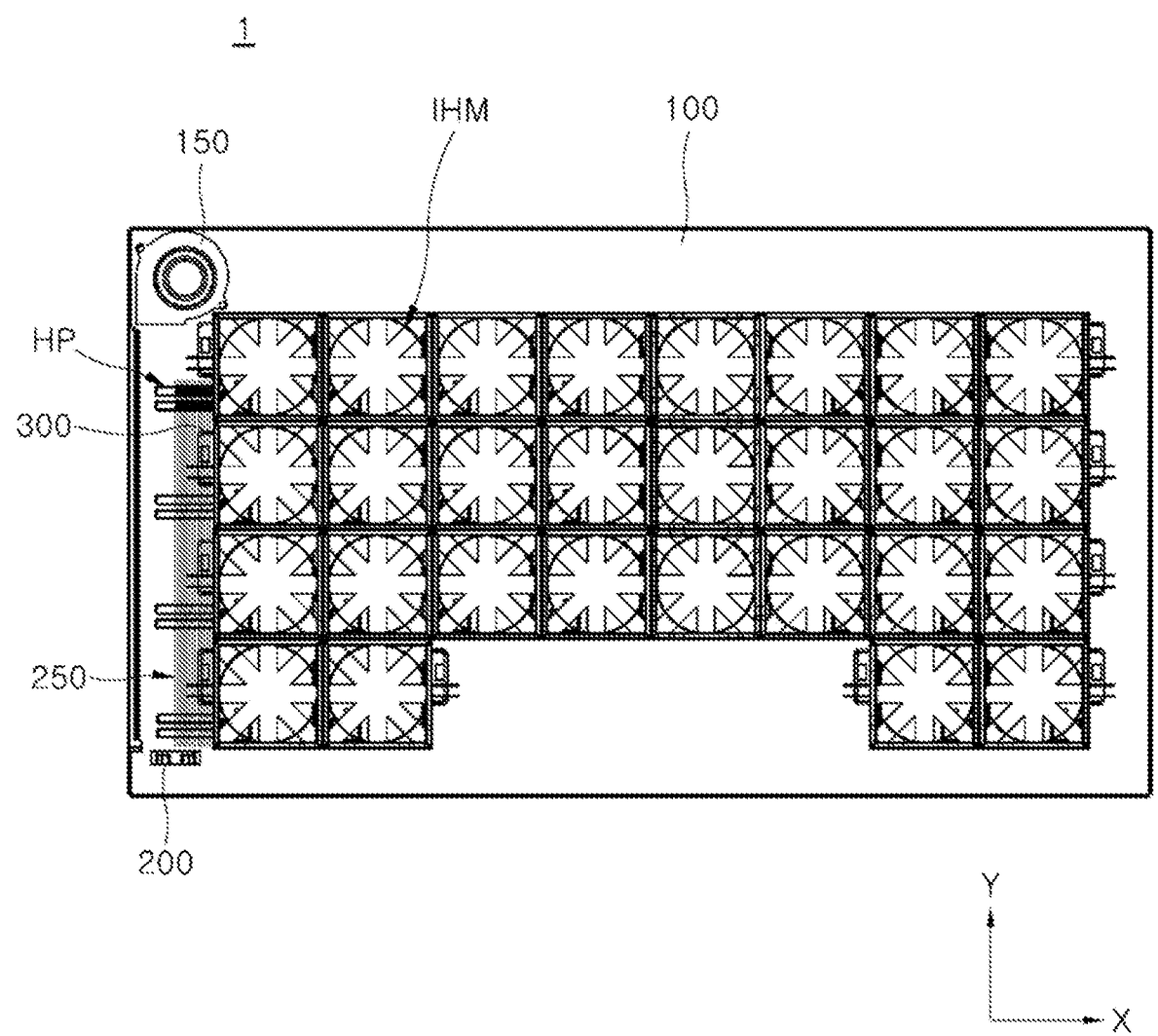
FIG. 2 is a top plan view of an example induction heating device according to one implementation of the present disclosure.
Figure 3:
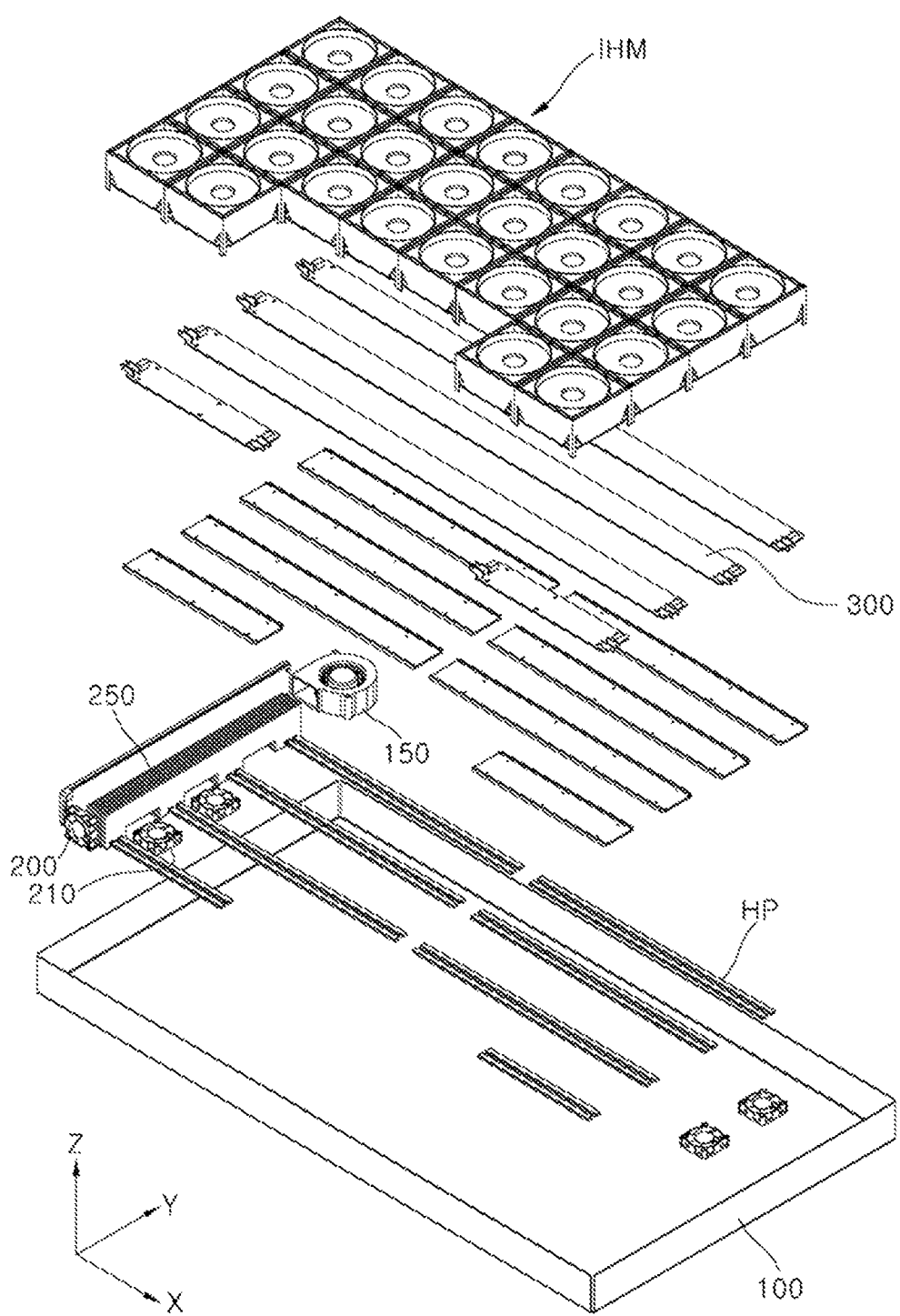
FIG. 3 and FIG. 4 are exploded perspective views of the induction heating device of FIG. 2.
Figure 4:
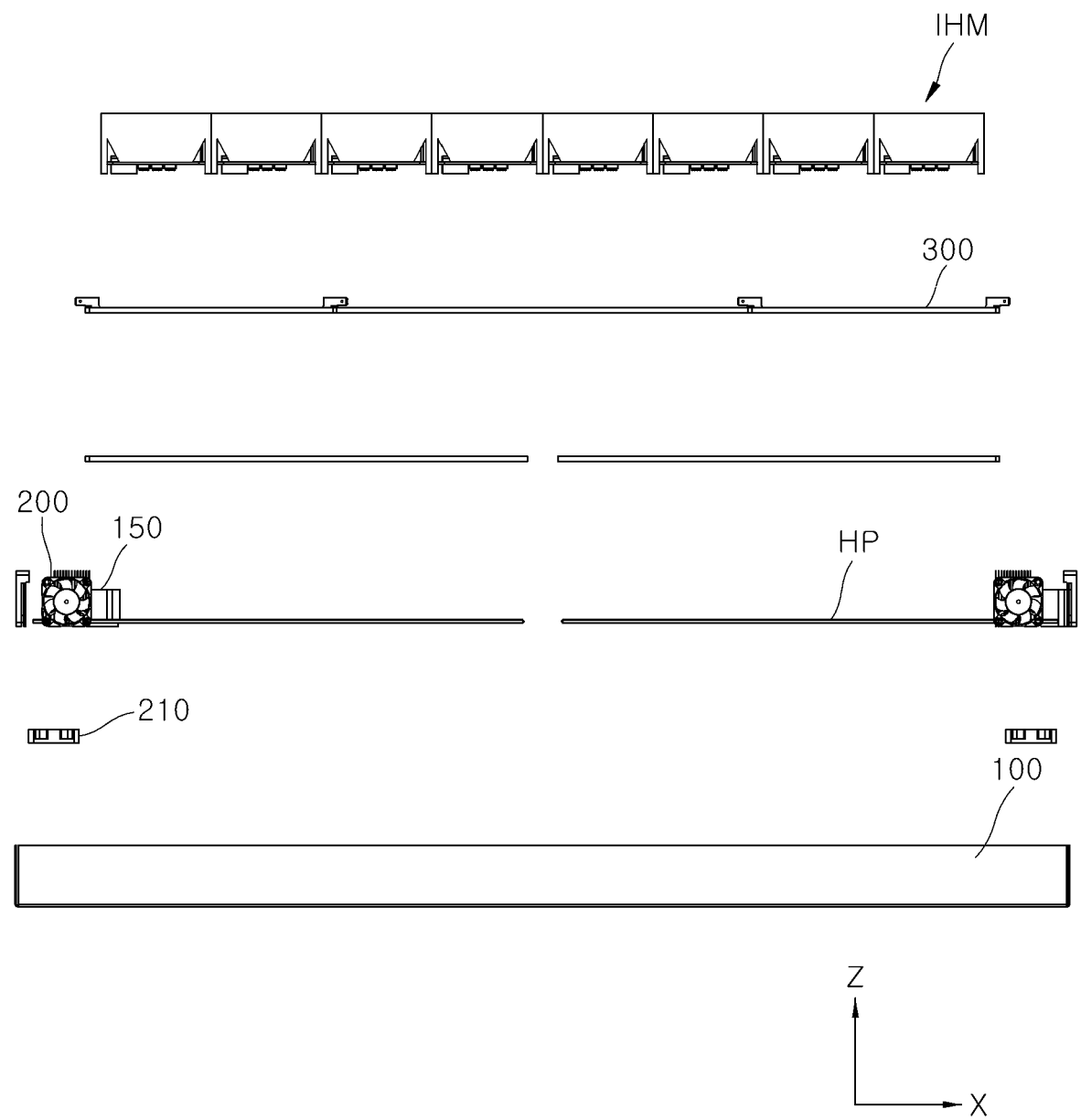
Figure 5:
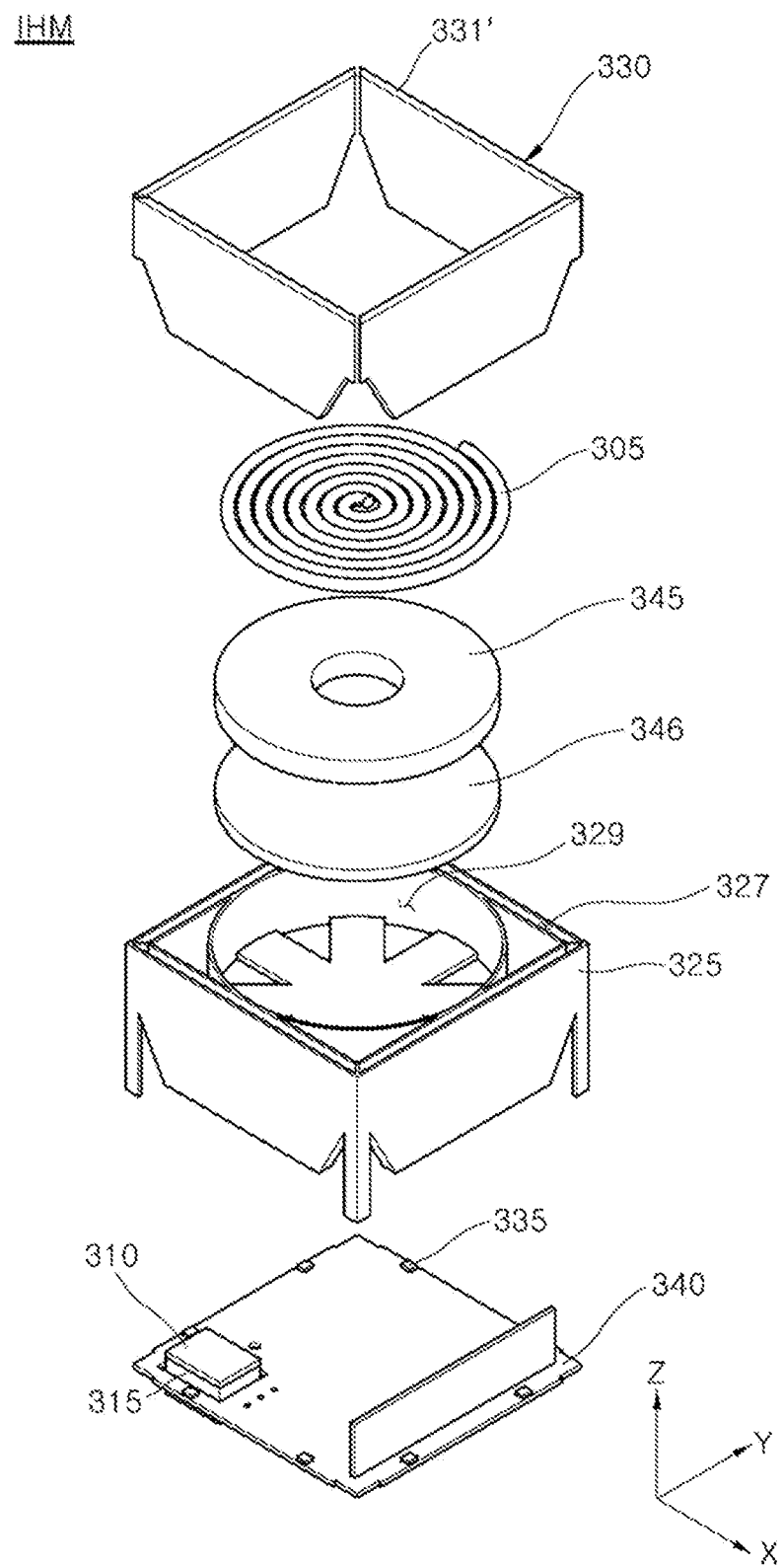
FIG. 5 is an exploded perspective view of an example induction heating module of FIG. 2.
Figure 6:
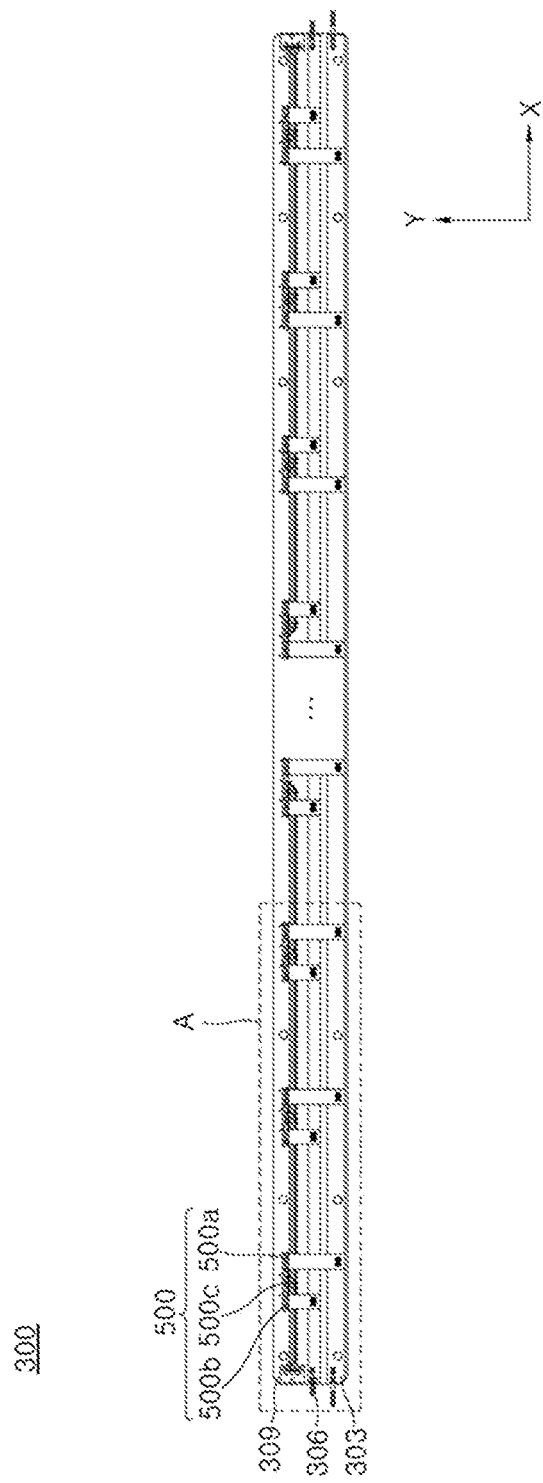
FIG. 6 is a schematic diagram illustrating an example wiring substrate of the induction heating module of FIG. 2.
Figure 7:
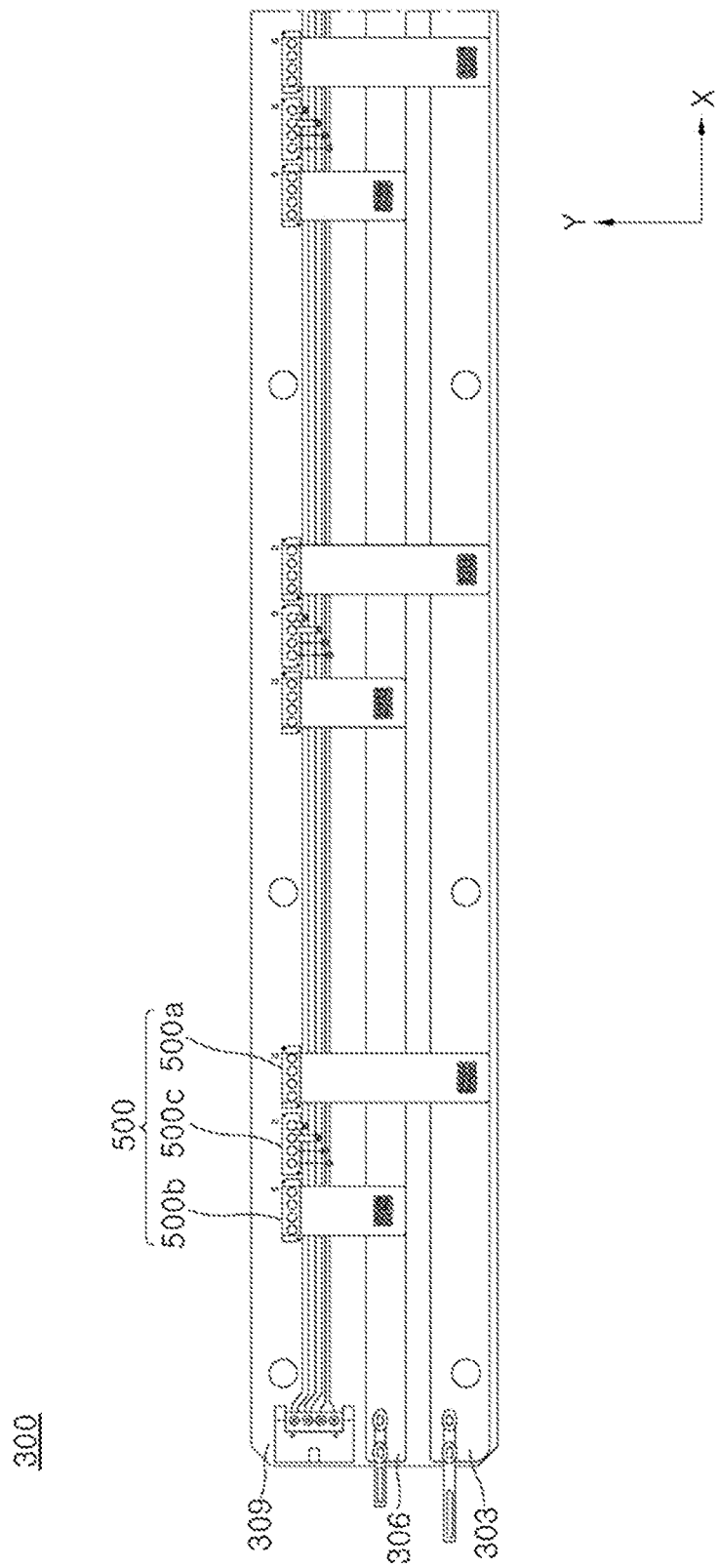
FIG. 7 is an enlarged view of the portion A of FIG. 6.
Figure 8:
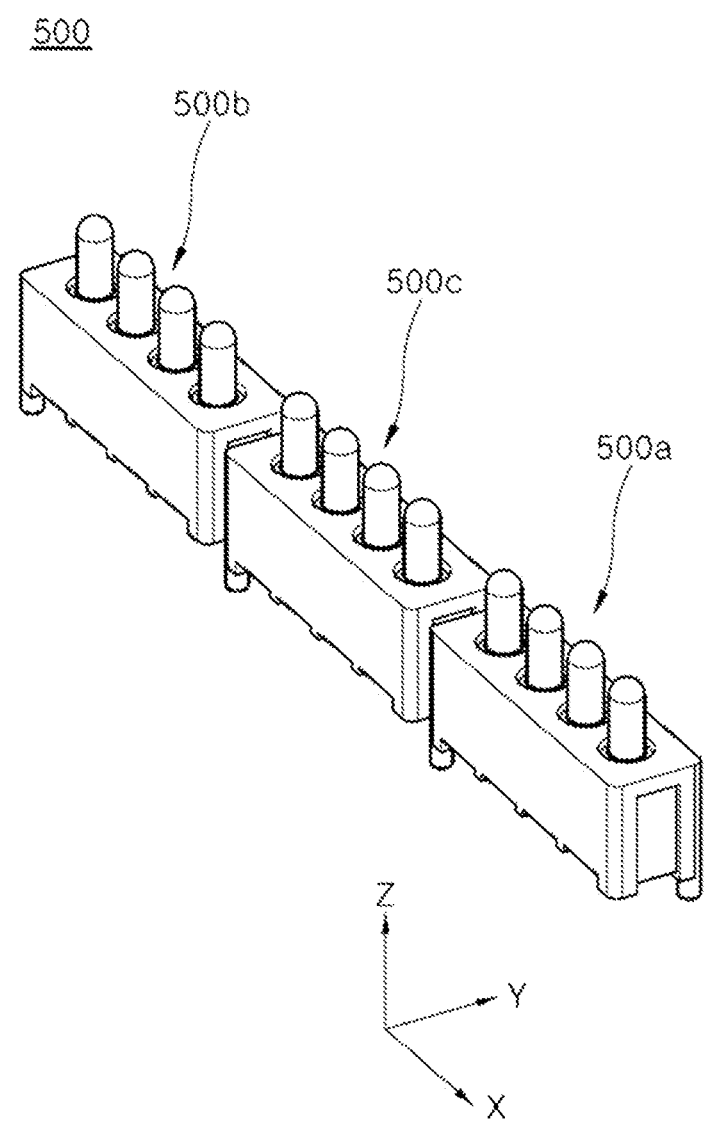
FIG. 8 is a perspective view illustrating an example connector of FIG. 6.

FIG. 2 is a top plan view of an example induction heating device according to one implementation of the present disclosure. FIG. 3 and FIG. 4 are exploded perspective views of the induction heating device of FIG. 2. FIG. 5 is an exploded perspective view of an example induction heating module of FIG. 2. FIG. 6 is a schematic diagram illustrating an example wiring substrate of the induction heating module of FIG. 2. FIG. 7 is an enlarged view of the portion A of FIG. 6. FIG. 8 is a perspective view illustrating an example connector of FIG. 6.

Referring first to FIG. 2 to FIG. 4, an induction heating device 1 according to one implementation of the present disclosure includes a casing 100, a cover plate, a plurality of induction heating modules (IHMs in following figures), a plurality of heat pipes (HPs in following figures), a plurality of wiring substrates 300, an air-discharge fan 150, a cooling fan 200, an auxiliary cooling fan 210, and a blowing-guide 250.

In some implementations, the numbers of the induction heating modules IHM, heat pipes HP, wiring substrates 300, air-discharge fans 150, cooling fans 200 auxiliary cooling fans 210, and blowing-guides 250, etc. as shown in FIG. 2 to FIG. 4 may vary depending on the size of the casing 100, or a device performance, etc. However, for convenience of illustration, the number of each component as shown in FIG. 2 to FIG. 4 will be exemplified.

The casing 100 houses therein the various components constituting the induction heating device 1, such as the plurality of induction heating modules (IHMs in following figures), the plurality of heat pipes (HPs in following figures), the plurality of wiring substrates 300, the air-discharge fan 150, the cooling fan 200, the auxiliary cooling fan 210, and the blowing-guide 250.

In some implementations, although not shown in the drawing, the casing 100 may further house a power supply that supplies power to various components such as the induction heating module IHM, the air-discharge fan 150, the cooling fan 200, and the auxiliary cooling fan 210. In some implementations, the power supply may supply AC power to the induction heating modules IHMs. An auxiliary power supply (for example, Switched Mode Power Supply (SMPS)) that supplies DC power to the induction heating module IHM may be further provided. In some implementations, a cover plate may be coupled to a top of the casing 100. A heat sink 315 (see FIG. 5) may be placed below an inverter 310 (see FIG. 5) of each induction heating module IHM.

In some implementations, the main power supply and auxiliary power supply may be connected to the wiring substrate 300. This will be described in more detail below.

In some implementations, the cover plate is coupled to an upper end of the casing 100 to seal an inside of the casing 100. A loaded-object to be heated such as a cooking vessel may be disposed on a top face of the cover plate. The cover plate may include a loading plate for loading thereon the loaded-object, such as a cooking vessel.

In some implementations, the loading plate may be made of, for example, a glass material. The loading plate may include an input interface that receives input from a user and transfers the input to a control module for the input interface as described below. The present disclosure may not be limited thereto. The input interface may be provided not on the loading plate but on another position in the device.

In some examples, the input interface may be a module used to input a heating intensity or a driving time of the induction heating device 1 as desired by the user. The input interface is controlled by a control module for the input interface. The input interface may be implemented in various ways using physical buttons or touch panels. In some implementations, the input interface may include, for example, a power button, a lock button, a power level control button (+, −), a timer control button (+, −), a charge mode button and the like.

In some implementations, the input interface transfers the input provided from the user to the control module for the input interface. Then, the input interface control module may transmit the input to the control module 340 (see FIG. 5) for the induction heating module IHM. The details of this will be omitted.

In some implementations, heat generated from the induction heating module IHM may be transferred through the loading plate to the loaded-object thereon. In addition, the casing 100 may be thermally insulated to prevent the heat generated by the induction heating module IHM from leaking to the outside.

The air-discharge fan 150 is installed at one corner inside the casing 100. The air-discharge fan 150 may discharge air inside the casing 100 to the outside of the casing 100. The cooling fan 200 is installed inside the casing 100 at a corner opposite to the air-discharge fan 150. The cooling fan 200 blows air to the air-discharge fan 150. In some implementations, the auxiliary cooling fan 210 is disposed on the bottom face of the casing 100 between the air-discharge fan 150 and the cooling fan 200. The auxiliary cooling fan 210 blows air upwards.

In some examples, the air-discharge fan 150 may suck the discharged air or wind from the cooling fan 200 and discharge the air or wind to the outside of the casing 100.

In some implementations, the air discharged from the cooling fan 200 may be guided by the blowing-guide 250 and may be transmitted to the air-discharge fan 150. The air guided by the blowing-guide 250 may flow while cooling the heat of the heat pipe HP. In some implementations, the air discharged upward from the auxiliary cooling fan 210 may cool the heat guided by the blowing-guide 250.

That is, as shown in FIG. 2, one end of the heat pipe HP protruding beyond the induction heating module IHM may be disposed on an air-flow path between the cooling fan 200 and the air-discharge fan 150. Thus, the air guided by the blowing-guide 250 may flow while cooling the heat pipe HP. In some implementations, the auxiliary cooling fan 210 cools the heat guided by the blowing-guide 250, thereby improving the cooling operation efficiency.

In some implementations, the blowing-guide 250 may extend between the air-discharge fan 150 and the cooling fan 200 in a second direction Y (Y axis direction) perpendicular to a first direction X (X axis direction), thereby to define the air-flow path. In some implementations, the blowing-guide 250 may include a plurality of plates extending in the second direction Y. The plates may be spaced apart in the first direction X. The number of the plurality of plates may vary.

In some implementations, the cooling fan 200 and the air-discharge fan 150 are respectively installed at the opposite corners inside the casing 100. The cooling fan 200 and the air-discharge fan 150 are not provided for each of the plurality of induction heating modules, but are provided commonly for the plurality of induction heating modules. This makes it possible to reduce the number of cooling-fans and air-discharge fans. In some examples, the auxiliary cooling fan 210 may be disposed below the blowing-guide 250. An individual auxiliary cooling-fan may be not provided for each of the multiple induction heating modules. A common auxiliary cooling-fan may be provided for the multiple induction heating modules. As a result, the number of auxiliary cooling-fans may be reduced.

In some implementations, the cooling fan 200 and the air-discharge fan 150 may be respectively installed only at the opposite corners inside the casing 100. The auxiliary cooling fan 210 may be disposed only under the blowing-guide 250. In this case, an available inner space in the casing 100 may increase.

In one example, although not shown in the drawing, when the induction heating device 1 further includes an additional cooling fan and an additional air-discharge fan. In this case, the additional cooling fan and the additional air-discharge fan may be respectively installed at further opposite corners which are far away from the cooling fan 200 and the air-discharge fan 150 shown in FIG. 2, inside the casing 100.

In some implementations, a plurality of heat sinks 315 (see FIG. 5) may be disposed under a plurality of induction heating modules (e.g., IHM), respectively, to dissipate the heat from the corresponding induction heating module IHM.

Each of a plurality of heat pipes (e.g., HPs) may be configured to extend in the first direction X. The plurality of heat pipes (e.g., HPs) may be arranged to be spaced apart from each other in the second direction Y. In some implementations, each heat pipe HP may be configured to extend in the first direction X through heat sinks disposed in the same row. Thus, the heat pipe may discharge the heat dissipated from the heat sinks in the same row out of the plurality of induction heating modules (for example, IHMs).

Each of the plurality of wiring substrates 300 may extend in the first direction X while the plurality of wiring substrates 300 may be spaced apart from each other in the second direction Y. In some implementations, each wiring substrate 300 may be coupled to bottoms of the induction heating modules IHMs disposed in the same row via a connector (500 in FIG. 6) including pogo pins. At least one of a power line and a signal line may be patterned in the wiring substrate 300. Details of those will be described later.

The induction heating module IHM may be a stand-alone or independent module that is independently driven.

In some examples, the induction heating module may include a plurality of induction heating modules. The plurality of induction heating modules (e.g., IHM) may be arranged in the first direction X and second direction Y, as illustrated in FIG. 2 to FIG. 4, to implement a zone-free based inductive heating device.

In some implementations, each of a plurality of induction heating modules (e.g., IHMs) is independently driven. Thus, each working coil in each heating module is also controlled independently.

In some implementations, an indicator may be arranged to indicate whether the working coil in each induction heating module IHM is driven and the heating intensity of the working coil. Each indicator may also be controlled independently.

In some implementations, the induction heating module IHM may be equipped with various components. Hereinafter, referring to FIG. 5, the induction heating module IHM will be specifically described.

FIG. 5 is an exploded perspective view of an induction heating module of FIG. 2.

Referring to FIG. 5, the induction heating module IHM includes a working coil 305, an inverter 310, a ferrite core 345, a thermally-insulating member 346, a module casing 325, a light emitting element 335, a control module 340 for the induction heating module IHM, and a light guide 330.

In some implementations, although not illustrated in the figure, the induction heating module IHM may include units associated with driving the working coil 305. For example, the units associated with driving the working coil 305 may include a rectifier rectifying an AC power from the power supply to DC power, a DC link capacitor reducing a ripple of the rectified DC power from the rectifier, and a relay or a semiconductor switch which turns on or off the working coil 305. Concrete examples of those components will be omitted.

First, the working coil 305 may be formed of a wire wound by a plurality of turns in an annular shape, and may generate an AC magnetic field. Below the further working coil 305, the ferrite core 345 may be disposed.

The inverter 310 may apply a resonant current to the working coil 305 via a switching operation.

In some examples, the driving operation (i.e., switching operation) of the inverter 310 is controlled by the control module 340 for the induction heating module IHM. The inverter includes first and second switching elements for performing switching operations. The inverter may apply a resonant current to the working coil 305 via switching operations of the switching elements.

In some implementations, each of the first and second switching elements may include an insulated gate bipolar transistor (IGBT). The heat sink 315 may be disposed below the inverter 310 (e.g., below the first and second switching elements). In some implementations, the inverter 310 may be arranged to be connected to the control module 340.

The ferrite core 345 may be disposed below the working coil 305 and may diffuse the AC magnetic field generated by the working coil 305. In some implementations, the ferrite core 345 may allow the direction of the AC magnetic field generated by the working coil 305 to be directed upwardly (that is, in a third direction Z perpendicular to a plane defined by the first and second directions X and Y).

The thermally-insulating member 346 may be disposed between the ferrite core 345 and the control module 340 for the induction heating module IHM.

In some examples, the thermally-insulating member 346 is disposed below the ferrite core 345 (e.g., between the ferrite core 345 and the module casing 325). The thermally-insulating member 346 may block heat generated from heating of the loaded-object via driving of the working coil 305 from being transmitted downwardly (e.g., toward the light emitting element 335 or the control module 340 for the induction heating module IHM).

In some implementations, the thermally-insulating member 346 may not be included in the induction heating module IHM. In this implementation of the present disclosure, an example is illustrated in which the thermally-insulating member 346 is included in the induction heating module IHM.

In some implementations, the working coil 305, the ferrite core 345, and the thermally-insulating member 346 may be stacked within an accommodation space 329 of the module casing 325.

The module casing 325 has the accommodation space 329 defined therein. The accommodation space 329 accommodates therein the stack of the working coil 305, the ferrite core 345, and the thermally-insulating members 346 therein. Guide-receiving grooves 327 (e.g., four grooves) in which light guides 330 to be described later are respectively inserted may be defined in the module casing 325 around the accommodation space 329.

In some implementations, the module casing 325 is disposed above the control module 340 for the induction heating module IHM. Thus, a size of the module casing 325 may be determined depending on a size of the working coil 305, the ferrite core 345, the thermally-insulating member 346, the control module 340 for the induction heating module IHM, and the like.

Each of the light emitting elements 335 may be disposed below each of the light guides 330 to emit light to each light guide 330.

In some examples, the operation of the light emitting element 335 may be controlled by the control module 340 for the induction heating module IHM, and the light emitting element 335 may be placed on the control module 340 for the induction heating module IHM. That is, the light emitting element 335 may be controlled not by a separate control module for driving the light emitting element, but by the control module 340 for the induction heating module IHM that controls driving of the inverter 310. In some implementations, the light emitting element 335 may be integrally coupled to the control module 340 for the induction heating module IHM.

In some implementations, the light emitting element 335 may be, but is not limited to, a light emitting diode (LED), for example. In some implementations, a plurality of light emitting elements 335 may be disposed, as illustrated in FIG. 8. In this case, the light emitting elements may be arranged on the control module 340 for the induction heating module IHM to be spaced from each other at a predetermined distance.

The control module 340 for the induction heating module IHM may control the driving of the induction heating module IHM including the inverter 310 and the light emitting element 335.

In some examples, the control module 340 may be implemented, for example, as a printed circuit board (PCB). The light emitting element 335 and the inverter 310 may be disposed on the control module 340.

In some implementations, the light emitting element 335 may be integrally coupled to the control module 340 for the induction heating module IHM, while the inverter 310 may be connected to the control module 340 for the induction heating module IHM.

In some implementations, the control module 340 for the induction heating module may be connected to the wiring substrate (300 in FIG. 6) via the connector (500 in FIG. 6) as described later. Details of this will be described later.

The light guides 330 may disposed around the corresponding working coil 305. Each of the light guides may indicate, through a top light-emission face 331 thereof, whether the working coil 305 is driven and the output intensity of the working coil.

In some examples, under each light guide 330, a corresponding light emitting element 335 is disposed. Each light guide 330 may diffuse the light emitted from the corresponding light emitting element 335 through the top light-emission face 331' to the outside.

In some implementations, a plurality of light guides 330 may be provided. For example, four light guides 330 may be provided to be inserted and fixed in the guide-receiving grooves 327 defined in the module casing 325, respectively.

In some implementations, as shown in FIGS., the light guide 330 may include an upper air-containing layer and a lower acrylic layer. That is, the upper space thereof may be filled with air while the lower space thereof may be filled with acrylic material. The top light-emitting face 331' may be defined as a top face of the air-containing layer.

That is, the upper portion of the light guide 330 defines the air-containing layer. This minimizes the effect of the heat generated by the heating of the loaded-object on the light guide 330.

In some implementations, a dimension in a vertical direction of the air-containing layer, that is, the dimension in the third direction Z, may be set equal to, for example, the vertical dimension of the acrylic layer. In this case, the light guiding effect by the light guide 330 may be optimized. Thus, using a small number of light emitting elements, light with brightness sufficient to be perceived by the user may be kept uniformly.

In some implementations, the lower layer of the light guide 330 may be made not of an acrylic material but of transparent material, such as glass, or synthetic resin, such as polycarbonate, polyamide, polyimide or the like. However, in this implementation of the present disclosure, it is assumed that the lower layer of the light guide 330 is made of an acrylic material.

In some implementations, the induction heating device 1 according to one implementation of the present disclosure may also have a wireless power transfer function, based on the configurations and features as described above.

That is, in recent years, a technology for supplying power wirelessly has been developed and applied to many electronic devices. An electronic device with the wireless power transmission technology may charge a battery by simply placing the battery on a charging pad without connecting the battery to a separate charging connector. An electronic device to which such a wireless power transmission is applied does not require a wire cord or a charger, so that portability thereof is improved and a size and weight of the electronic device are reduced compared to the prior art.

Such a wireless power transmission system may include an electromagnetic induction system using a coil, a resonance system using resonance, and a microwave radiation system that converts electrical energy into microwave and transmits the microwave. The electromagnetic induction system uses an electromagnetic induction between a primary coil provided in a unit for transmitting wireless power (for example, a working coil) and a secondary coil included in a unit for receiving the wireless power.

The induction heating device 1 heats the loaded-object via electromagnetic induction. Thus, the operation principle of the induction heating device 1 may be substantially the same as that of the electromagnetic induction-based wireless power transmission system.

Therefore, the induction heating device 1 according to one implementation of the present disclosure may have the wireless power transmission function as well as induction heating function. Furthermore, an induction heating mode or a wireless power transfer mode may be controlled by the control module for the input interface as described above. Thus, if desired, the induction heating function or the wireless power transfer function may be selectively used.

In this manner, the induction heating device 1 according to one implementation of the present disclosure may have the features and configurations as described above.

Hereinafter, with reference to FIGS. 6 to 12, the wiring substrate and the connector as described above will be described more specifically.

FIG. 6 is a schematic diagram illustrating a wiring substrate of the induction heating module of FIG. 2, FIG. 7 is an enlarged view of a portion A of FIG. 6. FIG. 8 is a perspective view illustrating a connector of FIG. 6, FIGS. 9 to 12 are schematic diagrams illustrating coupling between the induction heating module and the wiring substrate of FIG. 2.

Referring FIG. 6 to FIG. 8, the wiring substrate 300 is coupled via a connector 500 including a pogo pin to a bottom of the induction heating module (for example, IHM in FIG. 4). The wiring substrate 300 is formed to extend in the first direction X. At least one of the power lines 303, 306 and the signal line 309 may be patterned in the wiring substrate 300.

In some examples, the connector 500 may include first to third sub-connectors 500a, 500b, and 500c coupled to the bottom of the control module (340 of FIG. 5) for the induction heating module. In some implementations, each of the first to third sub-connectors 500a, 500b, and 500c may be implemented as a pogo pin (i.e., a pin including a cylinder and a spring loaded in the cylinder).

In some implementations, the power lines 303 and 306 patterned in the wiring substrate 300 may include a first power lines 303 for connecting the first sub-connector 500a coupled to the bottom of the control module (340 in FIG. 5) for the induction heating module to the power supply, and a second power line 306 for connecting the second sub-connector 500b coupled to the bottom of the control module (340 in FIG. 5) for the induction heating module to an auxiliary power supply. In some implementations, the patterned signal line 309 in the wiring substrate 300 may connect the control module for the input interface to the third sub-connector 500c coupled to the bottom of the control module (340 of FIG. 5) for the induction heating module. In this way, the input provided from the control module for the input interface may be transmitted via the signal line 309 to the control module (340 of FIG. 5) for the induction heating module.

Figure 9:
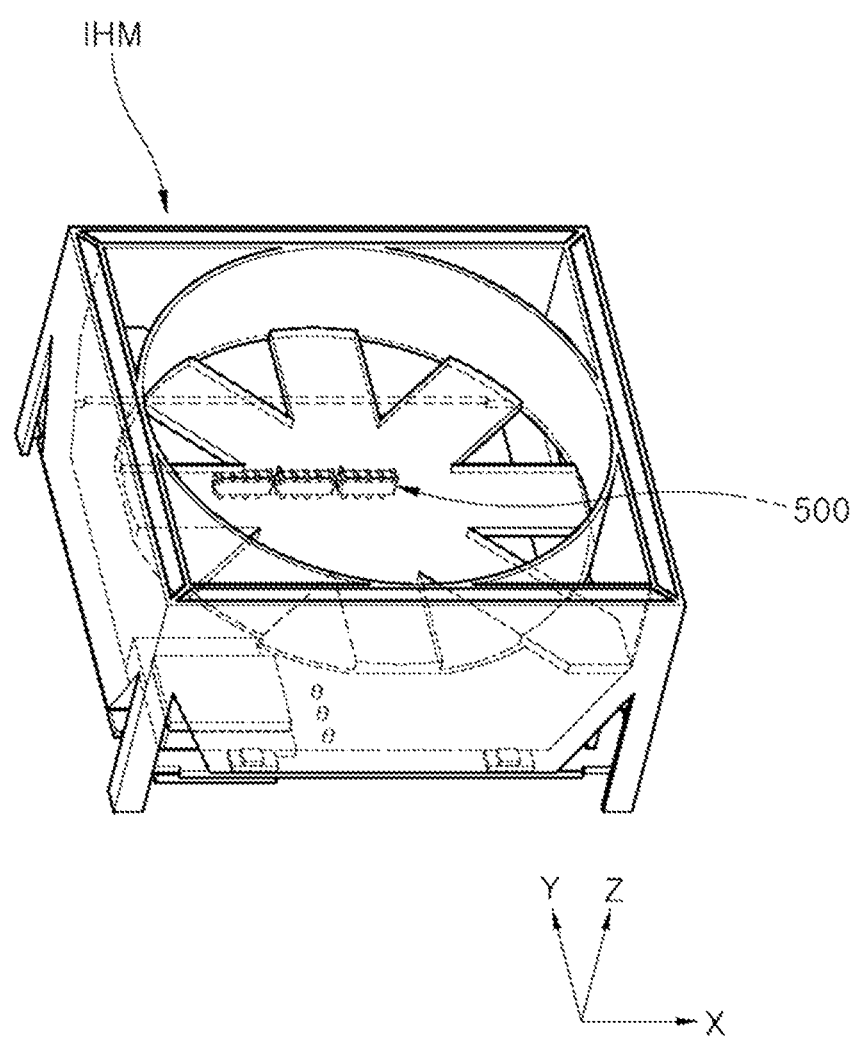
FIGS. 9 to 12 are schematic diagrams illustrating example coupling between the induction heating module and the wiring substrate of FIG. 2.
Figure 10:
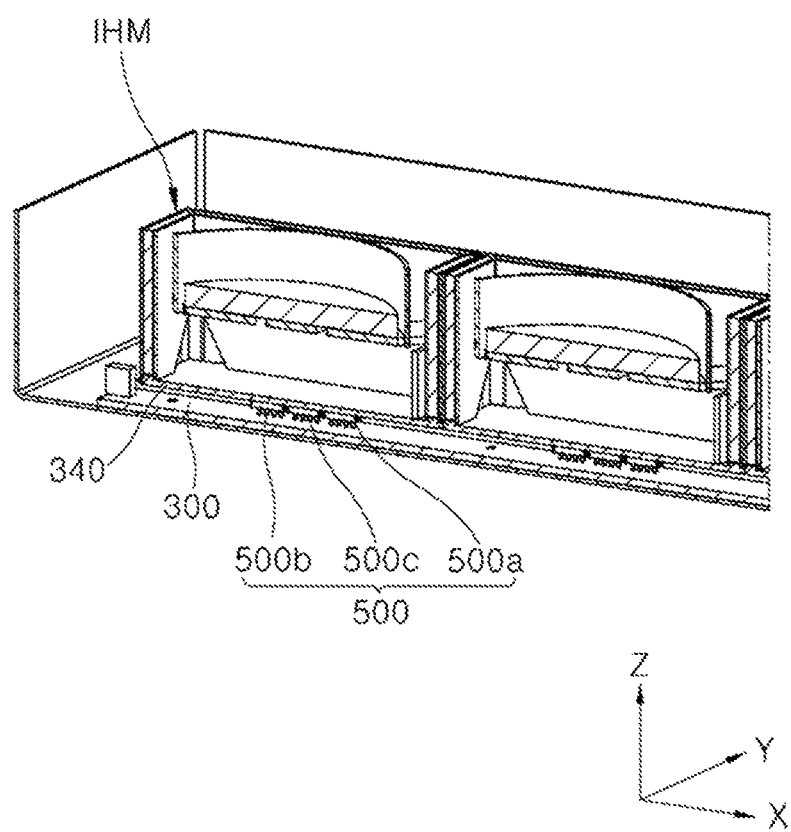
Figure 11:
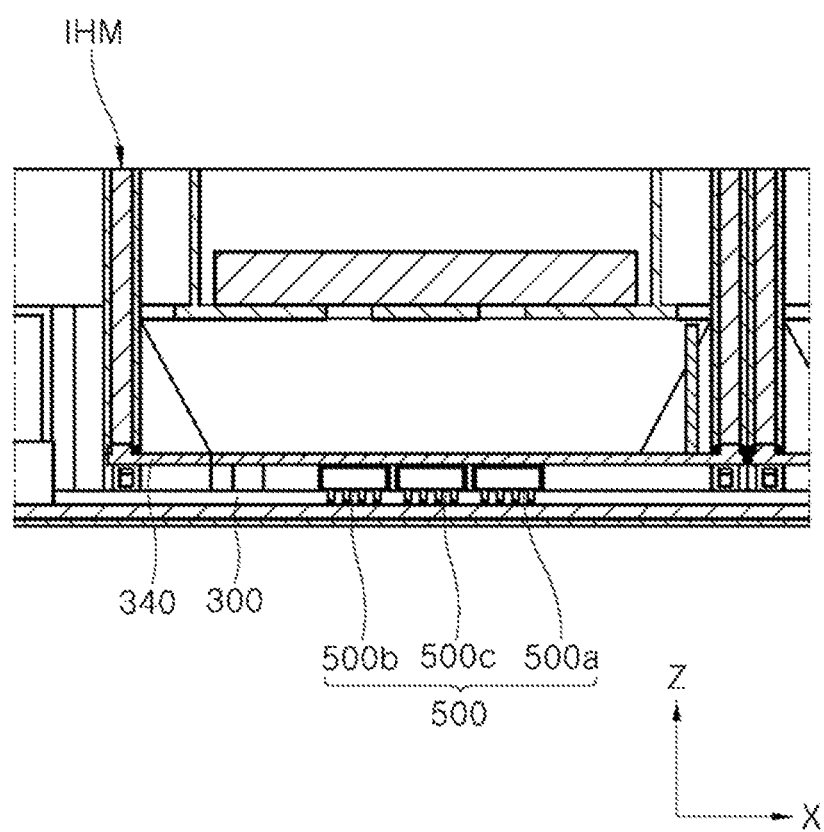

That is, as illustrated in FIGS. 9 to 11, the first to third sub-connectors 500a, 500b, and 500c electrically connect the wiring substrate 300 and the control module 340 for the induction heating module.

In some implementations, the plurality of induction heating modules IHMs are arranged in a matrix form in the first direction X and second direction Y. Thus, a corresponding connector 500 may be connected to a corresponding wiring substrate 300 to correspond to a location of a corresponding induction heating module.

Figure 12:
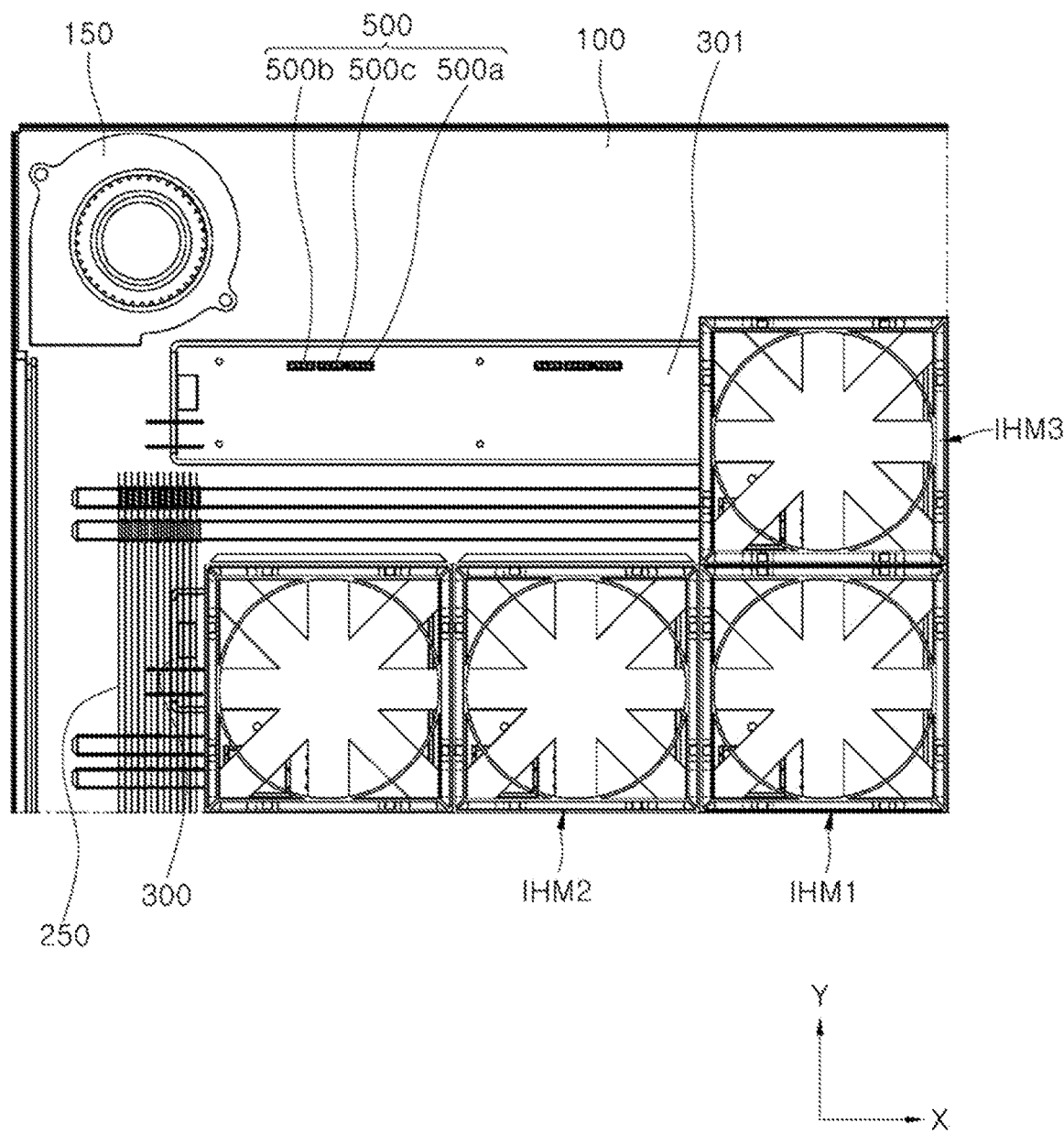

In some examples, as illustrated in FIG. 12, first to third induction heating modules IHM1 to IHM3 and first and second wiring substrates 300 and 301 are illustrated.

First, the second induction heating module IHM and the first induction heating module IHM are arranged in the first direction X and are arranged inside the casing 100. The third induction heating module IHM and the first induction heating module IHM are arranged in the second direction Y orthogonal to the first direction X. The third induction heating module IHM and the first induction heating module IHM are disposed inside the casing 100.

In some implementations, the second wiring substrate 301 and the first wiring substrate 300 are arranged to be spaced from apart in the second direction Y. Each of the second wiring substrate 301 and the first wiring substrate 300 may extend in the first direction X.

In this manner, the first induction heating module IHM may be coupled to the first wiring substrate 300 via a first connector including a pogo pin. The second induction heating module IHM may be coupled to the first wiring substrate 300 via a second connector including a pogo pin. In some implementations, the third induction heating module IHM may be coupled to the second wiring substrate 301 via a third connector including a pogo pin. In one example, the first to third connectors may be configured identically to the connector 500 illustrated in FIG. 12.

In some implementations, as illustrated in FIG. 3, each of the plurality of wiring substrates 300 spaced from each other in the first and second directions X and Y may be electrically connected to a corresponding induction heating module IHM via a corresponding connector.

As described above, in the induction heating device 1 according to one implementation of the present disclosure, each of the plurality of working coils and each of the plurality of the indicators may be independently controlled, thereby allowing the operation of each of the working coils and each of the indicators to be finely controlled. In some implementations, by finely controlling the operation of each of the working coils and each of the indicators, the heating region may also be finely controlled, which may improve user satisfaction.

In some implementations, the induction heating device 1 according to one implementation of the present disclosure may simplify the wiring connection structure by reducing the number of wire harnesses using the board-to-board connector-based connection. In some implementations, this may save a manufacturing cost and improve working efficiency.

Moreover, in the induction heating device 1 according to one implementation of the present disclosure, the board-to-board connector (e.g., connector 500) may be implemented as the pogo pin to prevent poor connections due to operator error. In some implementations, preventing the bad connection may minimize the board-to-board connector damage, which may lead to an improved product life.

In some implementations, in an induction heating device 1 according to one implementation of the present disclosure, the heat resistance and light emitting performances of the indicator (i.e., a combination of the light emitting element and the light guide) may be improved. As a result, the indicator damage due to heat may be minimized. In some implementations, with a small number of the light emitting elements, light with sufficient brightness for the user perception may be maintained uniformly.

In some implementations, in the induction heating device 1 according to one implementation of the present disclosure, the control module for the induction heating module may control the operations of the light emitting element and the inverter, thereby simplifying the structure of the indicator. As a result, the manufacturing cost and yield due to the reduction in the number of components may be improved. In some implementations, when the indicator is broken, it is easy to repair the indicator.

The detailed advantageous effects according to the present disclosure as well as the aforementioned effect have described above with regard to the implementations of the present disclosure. The present disclosure described above may be variously substituted, altered, and modified by those skilled in the art to which the present disclosure pertains without departing from the scope and sprit of the present disclosure. Therefore, the present disclosure is not limited to the above-mentioned exemplary implementations and the accompanying drawings.

What is claimed is:
1. An induction heating device comprising:
   a casing;
   a cover plate coupled to a top of the casing, the cover plate having a surface configured to seat an object;
   a first induction heating module located within the casing and configured to heat the object;
   a first wiring substrate that is configured to couple to a bottom of the first induction heating module and that extends in a first direction, the first wiring substrate comprising at least one of a power line or a signal line; and
   a first connector that is configured to couple the first wiring substrate to the bottom of the first induction heating module, the first connector comprising a pogo pin.
2. The induction heating device of claim 1, further comprising:
   a power supply located inside of the casing and configured to supply alternated current (AC) power;
   an auxiliary power supply located inside of the casing and configured to supply direct current (DC) power;
   an input interface configured to receive input from a user, the input interface being located at a loading plate that defines the surface of the cover plate configured to seat the object; and
   an interface control module configured to control operation of the input interface.
3. The induction heating device of claim 2, wherein the first induction heating module comprises an induction control module configured to control operation of the first induction heating module,
   wherein the interface control module is configured to receive input from the input interface and to transfer the input to the induction control module, and
   wherein the first connector comprises a first sub-connector, a second sub-connector, and a third sub-connector that are configured to couple to a bottom of the induction control module.
4. The induction heating device of claim 3, wherein the power line of the first wiring substrate comprises:
   a first power line configured to connect the power supply to the first sub-connector that is coupled to the bottom of the induction control module; and
   a second power line configured to connect the auxiliary power supply to the second sub-connector that is coupled to the bottom of the induction control module, and
   wherein the signal line is configured to connect the interface control module to the third sub-connector that is coupled to the bottom of the induction control module, the signal line being configured to transmit the input received from the interface control module to the induction control module.
5. The induction heating device of claim 1, further comprising:
   a second induction heating module located within the casing, wherein the first induction heating module and the second induction heating module are arranged in the first direction; and
   a third induction heating module located within the casing, wherein the first induction heating module and the third induction heating module are arranged in a second direction perpendicular to the first direction.
6. The induction heating device of claim 5, further comprising:
   a second wiring substrate that extends in the first direction and that is spaced apart from the first wiring substrate in the first direction;
   a third wiring substrate that extends in the first direction and that is spaced apart from the first wiring substrate in the second direction;
   a second connector that is configured to couple the second induction heating module to the second wiring substrate, the second connector comprising a pogo pin; and
   a third connector that is configured to couple the third induction heating module to the third wiring substrate, the third connector comprising a pogo pin,
   wherein the first connector, the second connector, and the third connector are independent from one another.
7. The induction heating device of claim 5, further comprising:
   a second wiring substrate that extends in the first direction that is spaced apart from the first wiring substrate in the second direction;
   a second connector that is configured to couple the second induction heating module to the second wiring substrate, the second connector comprising a pogo pin;
   a third connector that is configured to couple the third induction heating module to the second wiring substrate, the third connector comprising a pogo pin,
   wherein the first connector, the second connector, and the third connector are independent from one another.
8. The induction heating device of claim 1, wherein the first induction heating module comprises:
   a working coil;
   an inverter configured to apply a resonant current to the working coil;
   a light guide located outside of the working coil, the light guide having a light-emission surface that is located at a top of the light guide, that is configured to indicate whether the working coil is driven, and that is configured to indicate an output intensity of the working coil;
a light emitting element located vertically below the light guide and configured to emit light to the light guide; and
a control module configured to control the inverter and the light emitting element.

9. The induction heating device of claim 8, wherein the first induction heating module further comprises:
a ferrite core located vertically below the working coil and configured to diffuse magnetic field generated from the working coil; and
an insulation member that is located between the ferrite core and the control module and that is configured to reduce heat transfer to the control module.

10. The induction heating device of claim 9, wherein the first induction heating module further includes a module casing that is located vertically above the control module and that defines an accommodation space configured to accommodate the working coil, the ferrite core, and the insulation member that are vertically stacked,
wherein the module casing further defines a guide-receiving groove around the accommodation space, and
wherein the light guide is configured to insert into and couple to the guide-receiving groove.

11. The induction heating device of claim 8, wherein the control module comprises a printed circuit board (PCB), and
wherein the light emitting element and the inverter are disposed on the PCB of the control module.

12. The induction heating device of claim 1, further comprising:
a first heat sink located vertically below the first induction heating module and configured to dissipate heat from the first induction heating module;
a first heat pipe that passes through the first heat sink, that extends outward from the first induction heating module, and that is configured to discharge heat from the first heat sink out of the first induction heating module;
an air-discharge fan located at a first longitudinal end of an inner edge of the casing and configured to discharge air from an inside of the casing out of the casing; and
a cooling fan located at a second longitudinal end of the inner edge of the casing and configured to blow air to the air-discharge fan, the first longitudinal end being opposite to the second longitudinal end,
wherein the first heat pipe has an end that protrudes from the first induction heating module and that is located at an air-flow path defined between the cooling fan and the air-discharge fan.

13. The induction heating device of claim 12, further comprising a guide located between the air-discharge fan and the cooling fan, the guide defining the air-flow path.

14. The induction heating device of claim 13, wherein the guide extends in a second direction perpendicular to the first direction.

15. The induction heating device of claim 13, further comprising an auxiliary cooling fan that is located at a bottom of the casing vertically below the guide and that is configured to blow air to the guide.

16. The induction heating device of claim 12, wherein the air-discharge fan and the cooling fan protrude outward from the first wiring substrate in the first direction.

17. The induction heating device of claim 12, wherein the first heat pipe protrudes outward from the first wiring substrate in the first direction.

18. The induction heating device of claim 6, wherein the second connector is spaced apart from the first connector in the first direction, and
wherein the third connector is spaced apart from the first connector in the second direction.

19. The induction heating device of claim 6, wherein each of the first induction heating module, the second induction heating module, and the third induction heating module comprises an induction control module configured to control operation of the respective induction heating module.

20. The induction heating device of claim 19, wherein each of the first connector, the second connector, and the third connector comprises a plurality of sub-connectors that are configured to couple to a bottom of the respective induction control module.

* * * * *